United States Patent [19]
Redden

[11] Patent Number: 5,775,871
[45] Date of Patent: Jul. 7, 1998

[54] ROLLERLESS PLATE-FEEDING APPARATUS

[75] Inventor: Galen H. Redden, Gypsum, Kans.

[73] Assignee: Exide Corporation, Reading, Pa.

[21] Appl. No.: 715,405

[22] Filed: Sep. 18, 1996

[51] Int. Cl.⁶ .................................................. B65G 59/00
[52] U.S. Cl. ......................... 414/798.9; 414/797
[58] Field of Search ..................... 414/796.5, 797, 414/798.9, 905, 907

[56] References Cited

U.S. PATENT DOCUMENTS

| | | | |
|---|---|---|---|
| 3,527,367 | 9/1970 | Bivans | 414/798.9 |
| 4,168,772 | 9/1979 | Eberle | 414/798.9 |
| 4,407,063 | 10/1983 | Johnson | 29/623.2 |
| 4,462,745 | 7/1984 | Johnson et al. | 414/330 |
| 4,697,973 | 10/1987 | Hohn et al. | 414/798.9 |
| 4,758,126 | 7/1988 | Johnson et al. | 414/330 |
| 4,822,234 | 4/1989 | Johnson et al. | 414/798.9 |
| 4,824,307 | 4/1989 | Johnson et al. | 414/798.2 |
| 5,503,519 | 4/1996 | Schwetz et al. | 414/798.9 |
| 5,585,568 | 12/1996 | Moncrief et al. | 414/798.9 |

*Primary Examiner*—Karen M. Young
*Assistant Examiner*—Gregory A. Morse
*Attorney, Agent, or Firm*—Nixon & Vanderhye PC

[57] ABSTRACT

Apparatus is provided which does not rearwardly move a stack of plates (e.g., a stack of lead acid battery plates) upon approach of a vacuum pick-up head associated with a rotary carrier assembly. Instead, the apparatus maintains a predefined gap between the forwardmost plate in the stack and the rotary carrier assembly until a pick-up head is aligned substantially with the stack. At that time, a movable detent member releases the forwardmost one of the plates in the stack allowing it to be drawn across the gap by the vacuum force of the pick-up head. The timing of the detent member is such that it returns to its detent position to halt advance of the remaining plates in the stack toward the rotary carrier and thereby maintain the established gap between the rotary carrier assembly and the next forwardmost plate in the stack.

50 Claims, 8 Drawing Sheets

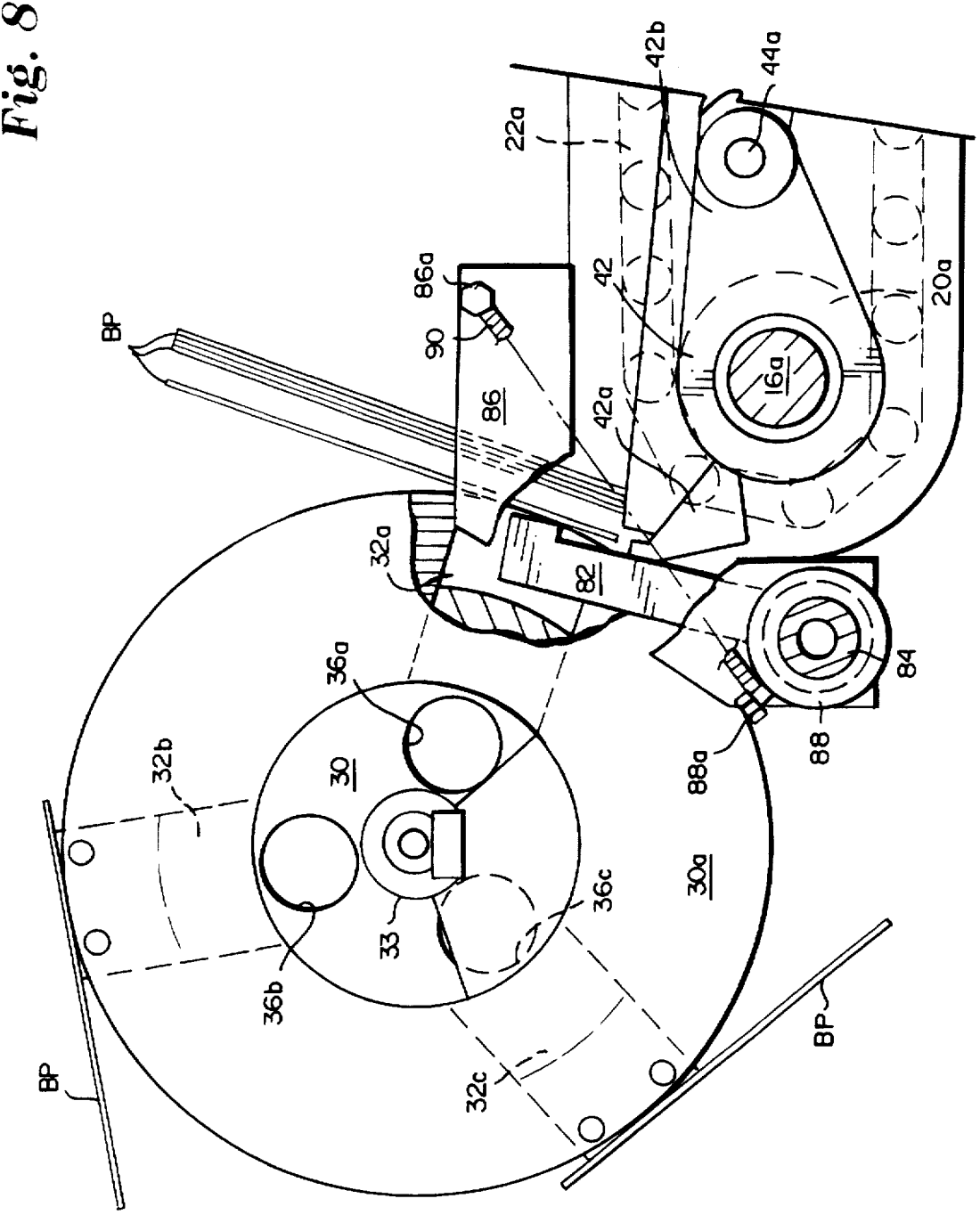

5,775,871

1

ROLLERLESS PLATE-FEEDING APPARATUS

FIELD OF INVENTION

The present invention relates generally to the sequential feeding of stacked plates. More specifically, the present invention relates to the sequential feeding of stacked lead acid storage battery plates to a rotary carrier having at least one vacuum pick-up head so that the plates are conveyed and reoriented for further downstream processing.

BACKGROUND OF THE INVENTION

It is necessary to reorient stacked lead plates during the production of lead acid storage batteries. In this regard, the stack of rigid lead plates is usually disposed on edge with individual plates being sequentially separated from the stack and conveyed to a horizontally disposed conveyor via a rotary vacuum pick-up head. Conventional apparatus which have been proposed to feed and reorient battery plates via a rotary vacuum pick-up head include U.S. Pat. Nos. 4,462,745 and 4,822,234 (the entire patent content of each being expressly incorporated hereinto by reference).

According to the '745 Patent, a rotary plate carrier includes a single vacuum pick-up head so as to strip the forwardmost plate from the stack and convey it to a horizontally disposed downstream conveyor. The carrier includes a planar chordal segment located on a portion of its periphery which is slightly shorter than or equal to the height of the plates being handled. When the forwardmost plate and chordal segment are aligned, the centerline of the forwardmost plate is offset from the centerline of the chordal segment in the direction towards which the carrier rotates, in order that the bottom edge of the forwardmost plate does not strike the remaining plates in the stack as it is rotated away from the stack by the carrier. This alignment is aided by a ramp which supports the plates at the front of the stack at the appropriate angle and lifts them off the feed conveyor belts.

The '234 Patent discloses a plate feed apparatus having a rotary carrier which is comprised of a spaced-apart pair of cylindrical carrier plates which rotate together as a unit on a common axle. Extending between the carrier plates, at three equally-spaced radial locations, are hollow rectangular mounting blocks on which is mounted a respective gripping head. A roller extends between the carrier plates in front of each gripping head. The roller extends outwardly from the periphery of the gripping head and thus moves the stack of plates away from the gripping head as the gripping head approaches the stack. This movement of the stack away from the approaching gripping head is said to ensure that the leading edge of the gripping head does not interfere with the stack and creates a small gap between the stack and the gripping head when they become aligned.

SUMMARY OF THE INVENTION

Broadly, the present invention involves apparatus which does not rearwardly move the stacked plates upon approach of a vacuum pick-up head associated with a rotary carrier assembly. Instead, according to the present invention, apparatus is provided which maintains a predefined gap between the forwardmost plate in the stack and the rotary carrier assembly until a pick-up head is aligned substantially with the stack. At that time, a movable detent member will release the forwardmost one of the plates in the stack allowing it to be drawn across the gap by the vacuum force of the pick-up head. The timing of the detent member is such that it returns to its detent position to halt advance of the remaining plates

2 in the stack toward the rotary carrier and thereby maintain the established gap between the rotary carrier assembly and the next forwardmost plate in the stack.

These and other aspects and advantages of the present invention will become more clear after careful consideration is given to the following detailed description of the preferred exemplary embodiments thereof.

BRIEF DESCRIPTION OF THE DRAWINGS

Reference will hereinafter be made to the accompanying drawings wherein like reference numerals throughout the various FIGURES denote like structural elements, and wherein;

FIGS. 7 and 8 are detailed side elevational views showing an exemplary operational sequence of the plate feeding apparatus according to this invention using the optional vacuum assist transfer arm assembly depicted in FIG. 6.

DETAILED DESCRIPTION OF THE PREFERRED EXEMPLARY EMBODIMENTS

Figure 1:
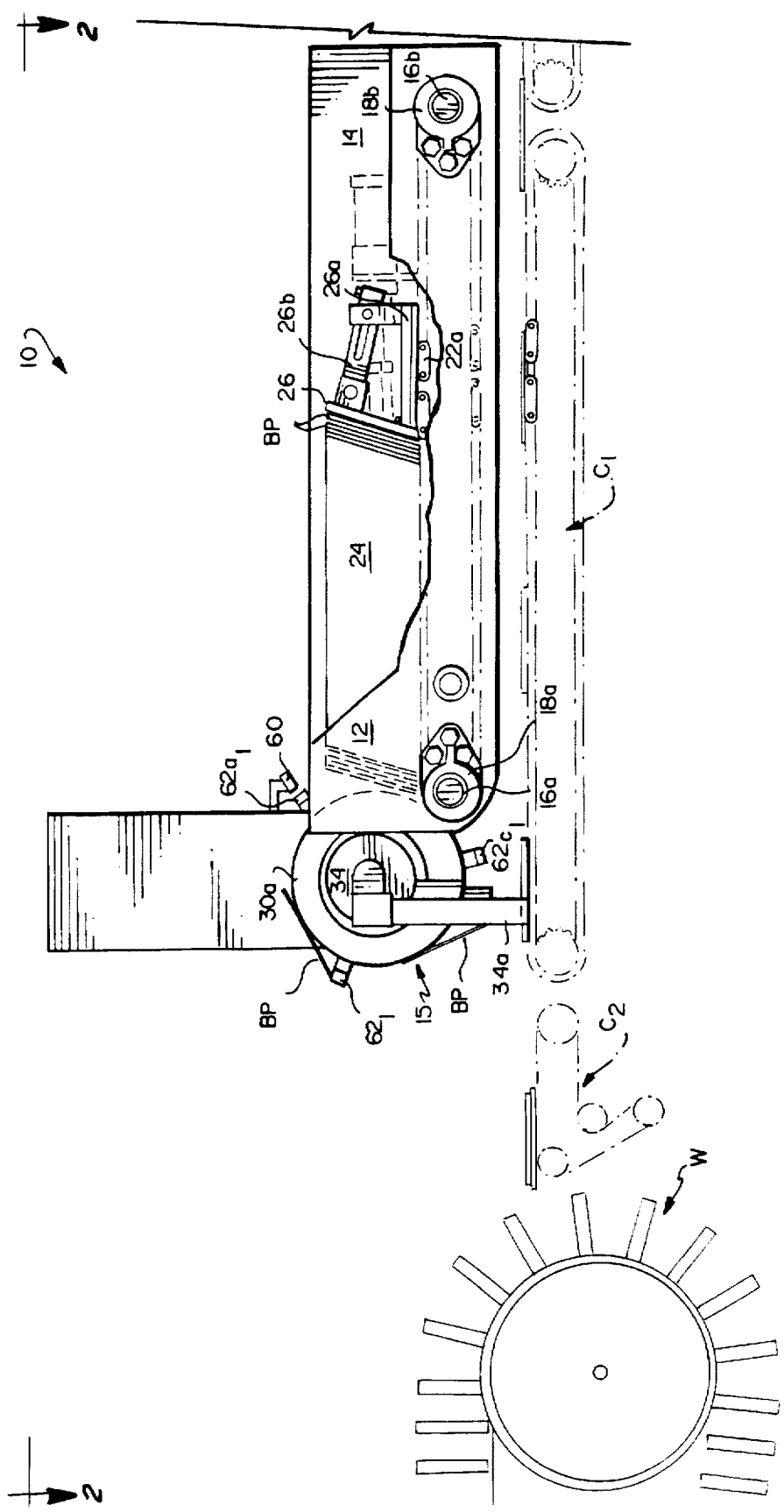
FIG. 1 is a side elevational view of a plate feeding apparatus according to the present invention.
Figure 2:
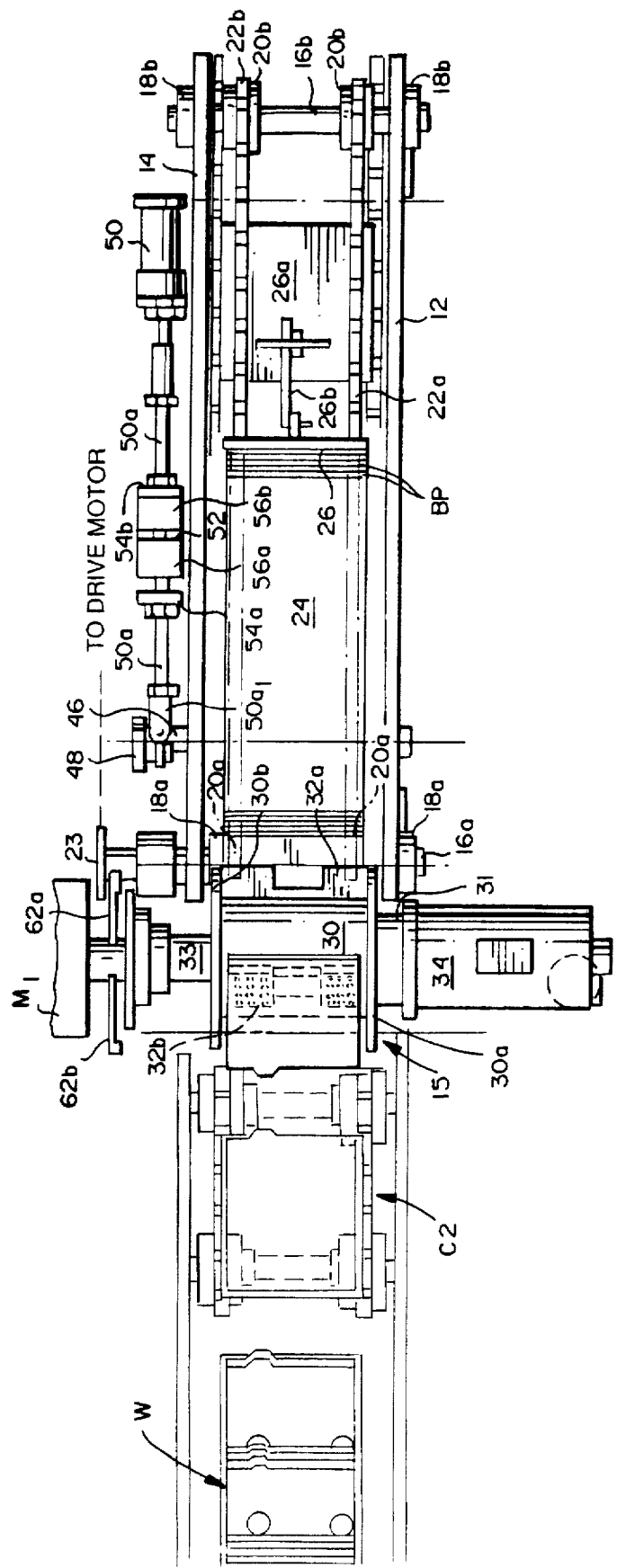
FIG. 2 is a top plan view of the plate feeding apparatus depicted in FIG. 1 as taken along line 2—2 therein.

Accompanying FIGS. 1 and 2 show a preferred plate-feeding apparatus 10 according to the present invention. In this regard, the apparatus 10 generally includes a pair of laterally separated side frames 12, 14 positioned rearwardly of a rotary carrier assembly 15. A pair of longitudinally separated indexing shafts 16a, 16b are journalled to the side frames 12, 14 via bearings 18a, 18b, respectively. Each of the shafts 16a, 16b carry a pair of sprockets 20a, 20b for driving a pair of indexing chains 22a, 22b, respectively. The forward shaft 16a is coupled by belt, chains or the like to a drive motor (not shown) via drive sprocket 23 so as to cause the indexing chains 22a, 22b to move forwardly toward the rotary carrier assembly 15.

The indexing chains 22a, 22b support a stack 24 of lead acid battery plates (a few of which are identified by the reference "BP" in FIGS. 1 and 2) which are slightly rearwardly inclined relative to the conveyance direction of the chains 22a, 22b. In this regard, the stack is supported rearwardly by a support brace 26 which is attached to a traveler base 26a via an adjustable connection arm 26b. The traveler base 26a moves with the indexing chains 22a, 22b and in so doing causes the support brace to push the plate stack 24 forwardly toward the rotary carrier assembly 15.

Figure 3:
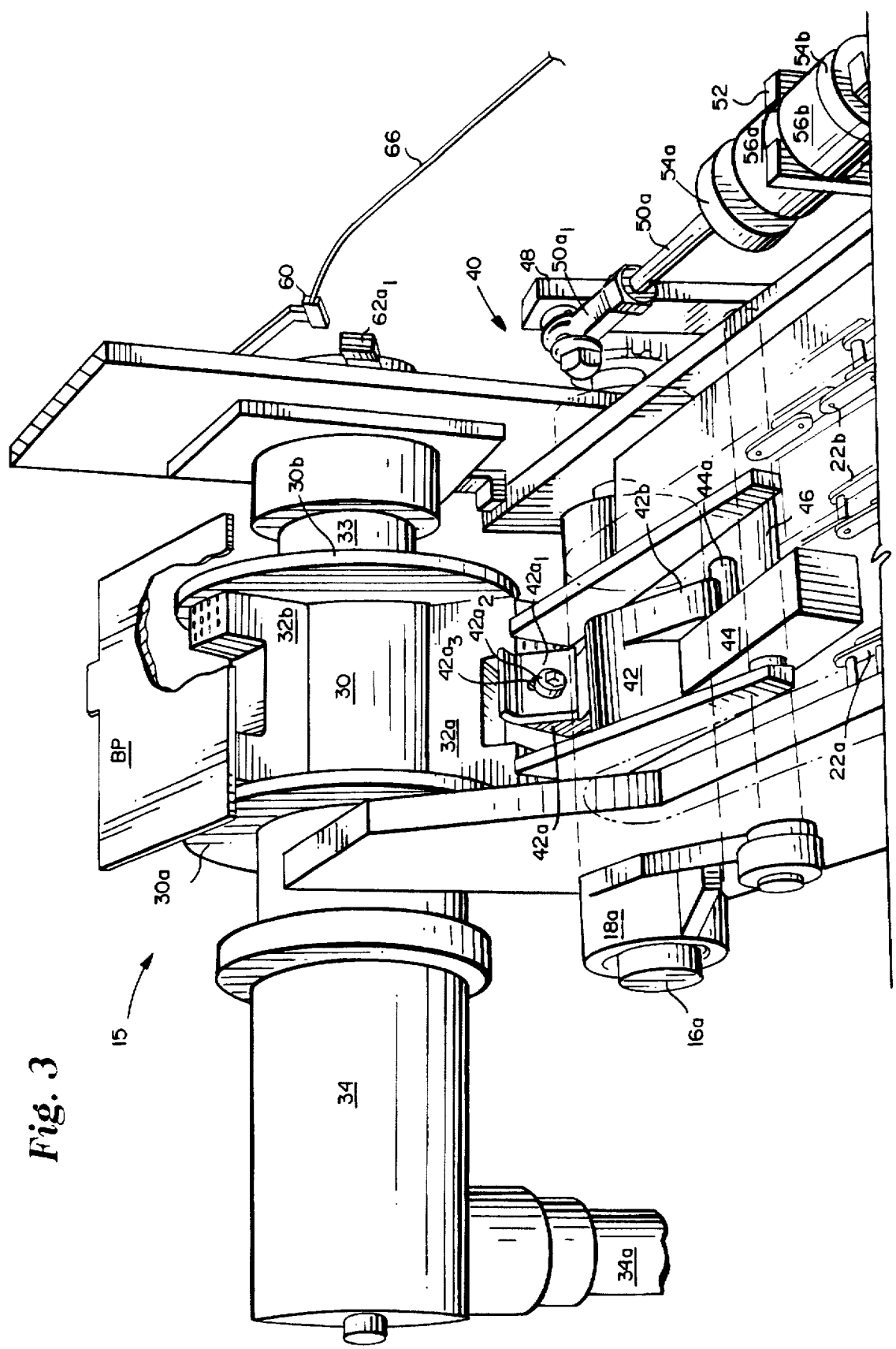
FIG. 3 is a partial perspective view of the plate feeding apparatus according to this invention as viewed from the rear end thereof.
Figure 4:
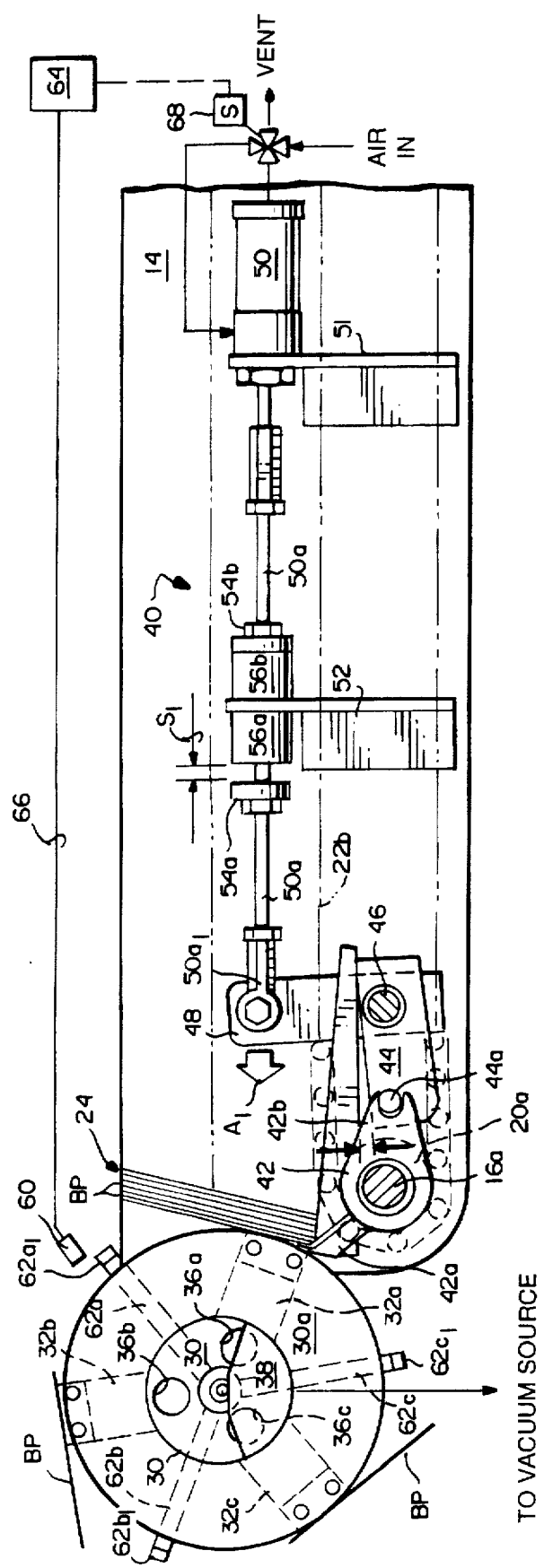
FIGS. 4 and 5 are detailed side elevational views showing an exemplary operational sequence of the plate feeding apparatus according to this invention.

As is perhaps more clearly shown in FIGS. 3 and 4, the rotary carrier assembly 15, includes a hollow carrier drum 30 having a pair of end plates 30a, 30b and three generally U-shaped vacuum pick-up heads 32a–32c substantially equally radially spaced-apart from one another about the carrier drum's circumference. The carrier drum 30 (and hence the pick-up heads 32a–32c carried thereby) is rotated about drum shaft 33 via a drive motor M1 (see FIG. 2) in a counterclockwise direction (as viewed in FIG. 1). The individual battery plates BP will therefore be extracted sequentially from the stack 24 by the pick-up heads 32a–32c and delivered to a downstream location (e.g., to plate cell organizer wheel W via conveyors C1 and C2).

The vacuum drum 34 is sealingly coupled to the hollow carrier drum 30 via coupling 31 and is connected to a vacuum source via conduit 34a. In this regard, each of the pick-up heads 32a–32c is capable of being fluid-connected to the interior of the vacuum drum 34 by openings 36a–36c, respectively (see FIGS. 4 and 5). Since the forward face of the pick-up heads include a dense plurality of apertures, a vacuum will be drawn through such apertures to cause the individual battery plates BP to be carried by the drum 30 during a major portion of its rotary travel.

The vacuum drum 34 includes a stationary timing plate 38 so that, as the drum 30 rotates, fluid communication between the openings 36a–36c and the vacuum drum 30 will sequentially be terminated and re-established by virtue of the timing plate 38. Specifically, as shown more clearly in FIGS. 4 and 5, the opening 36c is practically completely blocked by the timing plate 38. As such, the vacuum being drawn through the apertures of the pick-up head 32c is about to be terminated since the timing plate is about to terminate fluid-communication between the opening 36c and the vacuum drum 30, which causes the battery plate BP to fall by gravity away from the carrier assembly 15 (e.g., onto the conveyor C1). At the same time, however, fluid communication is about to be completely re-established between the opening 36a and the vacuum drum since the opening 36a is about to be rotated out of registry with the timing plate 38. Re-establishment of fluid communication between the opening 36a and the vacuum drum 34 thereby allows the pick-up head 32a to physically remove the forwardmost one of the battery plates BP from the stack 24. Thereafter, the vacuum being drawn through the apertures of pick-up head 32a will enable the battery plate to be carried through a major portion of the drum's 30 rotary travel until it encounters the timing plate 38. In such a manner, therefore, the battery plates BP may automatically be stripped the stack 24, carried by the rotary drum 30, and then deposited onto the conveyor C1. As such, the battery plates BP will be sequentially reoriented as desired for further downstream processing.

Important to the present invention, the apparatus 10 includes a plate feed assembly 40, the structures and functions of which will be discussed below with particular reference to FIGS. 3–5. Specifically, the plate feed assembly 40 includes a detent member 42 which coupled to the shaft 16a for free pivotal movements thereabout. The detent member 42 is provided with a forwardly and upwardly extending detent finger 42a and a rearwardly extending pair of laterally separated yoke flanges 42b (only one of which is visible in FIGS. 3–5).

The detent finger 42 is most preferably (but not necessarily) provided with a shim plate 42a$_1$ which is removably coupled to the detent finger 42 via set screw 42a$_2$ and elongate aperture 42a$_3$. The shim plate 42a$_1$, if present, can be of any desired thickness so as to permit selective adjustment of the gap between the forwardmost battery plate BP in the stack 24 and the pick-up head assembly 15. Thus, a thicker shim plate 42a$_1$ will result in a greater gap being defined, while a thinner (or no) shim plate 42a$_1$ will result in a lesser gap being defined.

The yoke flanges 42b are each connected operatively to a respective end of the coupling shaft 44a which is rigidly carried at the forward end of rocker arm 44. The rearward end of rocker arm 44 is, in turn, rigidly coupled to rocker shaft 46 which is pivotally mounted crosswise between the side frames 12, 14. An actuation lever 48 has its lower end rigidly coupled one end of the rocker shaft 46 and its upper end pivotally coupled to the terminal end 50a$_1$ of actuator rod 50a associated with double acting actuator cylinder 50. The cylinder 50 is supported by bracket 51 attached to side frame 14.

The actuator rod 50a is supported about midway of its length via support bracket 52 and threadably carries forward and rearward stroke adjustment disks 54a, 54b, respectively. Elastomeric stop cylinders 56a, 56b are in turn respectively positioned between the adjustment disks 54a, 54b and the support bracket 52. Threaded movement of the adjustment disks 54a, 54b along the actuator rod 50a towards and away from the elastomeric stop cylinders 56a, 56b will thus allow precise adjustment of the linear stroke (noted by dimensions S1 and S2 in FIGS. 4 and 5) of actuator rod 50a, which will, in turn allow adjustment to be made to the reciprocal pivotal movement of the detent finger 42a of detent member 42.

In this regard, direct actuation of the cylinder 50 will cause the actuator rod 50a to extend in the direction of arrow A$_1$ in FIG. 4 which, in turn, drives the upper end of the actuator lever 48 forwardly to cause the rocker shaft 48 to pivot in a counter-clockwise direction as viewed in FIG. 4. The rocker arm 44 will likewise rotate in a counter-clockwise direction as viewed in FIG. 4 (since it is rigidly coupled to the rocker shaft 46) which drives the coupling shaft 44a downwardly and causes the detent member 42 to rotate clockwise as viewed in FIG. 4 about shaft 16a due to the operative connection between the yoke flanges 42b and the coupling shaft 44a. As a result, the detent finger is moved into contact with the lower edge portion of a forwardmost one of the battery plates in the stack 24. The detent finger 42a thus causes a small, but meaningful, gap to exist between the forwardmost one of the battery plates BP in the stack 24 and the pick-up head assembly 15. Such a state is shown in FIG. 4.

Figure 5:
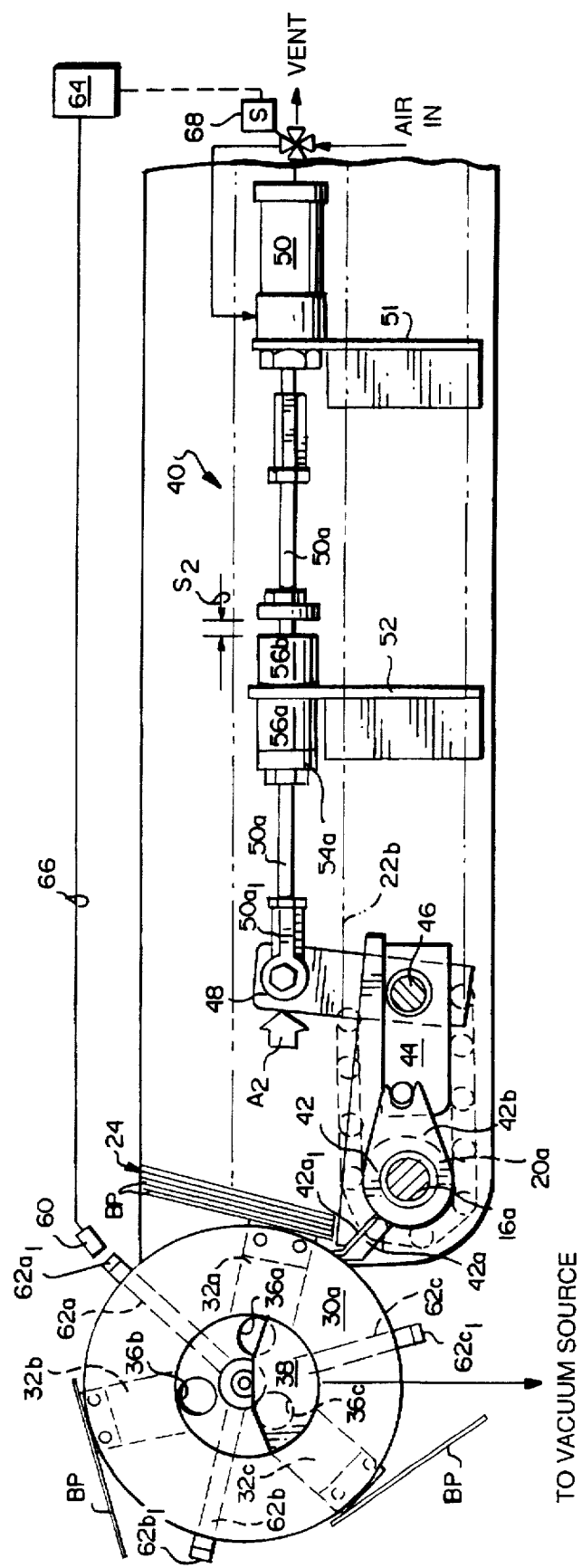

Upon rotation of the drum 30 in the manner described above, one of the pick-up heads (which in the case shown in FIGS. 4 and 5 is pick-head 32a) will be brought into alignment with the forwardmost one of the battery plates in the stack 24. The pick-up head 32a will thus have sufficient vacuum being drawn through its apertures so as to strip the forwardmost one of the battery plates BP from the stack 24 and allow it to be transferred across the defined gap upon its release by the detent finger 42a. At this time, the cylinder 50 is reverse actuated so as to retract the actuator rod 50a in the direction of arrow A$_2$ in FIG. 5. The pivotal directions of the actuator lever 48, rocker shaft 46 and rocker arm 44 will thereby be reversed to that described above (i.e., clockwise as viewed in FIG. 5) so as to drive the coupling shaft 44a upwardly. This movement of the coupling shaft 44a will, in turn, cause the detent member 42 to rotate counter-clockwise as viewed in FIG. 5 thereby moving the detent finger 42a out of engagement with the forwardmost battery plate BP in the stack 24. At this moment, since the pick-up head 32a is aligned with the stack 24, the forwardmost battery plate BP will be transferred across the previously defined gap and come into contact with the pick-up head 32a.

In the brief moment that the battery plate BP is captured by the pick-up head 32a due to the vacuum being drawn through the pick-up head's apertures, the carrier assembly 15 will continue to rotate thereby moving the lower edge of the captured battery plate BP away from the detent finger 42a. At that time, the air cylinder will again be actuated so as to drive the actuator rod 50a in the direction of arrow A1 so that the detent finger 42a comes into contact with the lower edge of the next sequential battery plate BP in the stack as shown by FIG. 4. This cycle continuously repeats itself during the continuous rotation of the carrier assembly 15 so as to sequentially transport and reorient the battery plates BP in the stack 24.

Actuation of the cylinder 50, and hence movement of the detent finger 42a between its detent position (where it contacts the lower edge of a forwardmost battery plate BP in the stack 24 as shown in FIG. 4) and a release position (where the detent finger 42a is spaced from the lower edge of a forwardmost battery plate BP in the stack 24 as shown in FIG. 5), must of course be accurately synchronized to the rotation of carrier assembly 15 and the resulting sequential alignment of the pick-up heads 32–32c with the stack 24. Most preferably, according to the present invention, such synchronized actuation of the cylinder 50 is achieved using a photoelectric sensor 60 and a spoked synchronizing wheel 62. The preferred photoelectric sensor 60 is model number E3A2-X commercially available from Omron Electronics, Inc. of Schaumburg, Ill.

The synchronizing wheel 62 is provided with spokes 62a–62c corresponding in number to the number of pick-up heads 32a–32c, respectively. Each spoke 62a–62c has a terminal end $62a_1$–$62c_1$ which provides a target for the sensor 60. The synchronizing wheel 62 rotates as a unit with the drum 30 and, in so doing, will sequentially present the terminal ends $62a_1$–$62c_1$ to the sensor 60 in advance of the vacuum pick-up head 32a–32c with which they are associated. Thus, as shown in FIG. 4, the terminal end $62a_1$ has not yet been rotated into sufficiently close proximity with the sensor 60 so that the detent finger 42a remains engaged with the lower edge of the forwardmost battery plate BP in the stack 24. However, as shown in FIG. 5, the terminal end $62a_1$ and the sensor are directly opposed to one another causing an optical signal to be sent to the optical controller 64 via optical fiber 66. Upon receipt of the optical signal from the sensor 60, the controller 64 will in turn issue an electrical command signal to operate four-way solenoid valve 68 thereby causing the cylinder to retract the actuator rod 50a and move the detent finger 42a into its release position as described previously and shown in FIG. 5.

Upon further rotation of the drum 30, and hence the synchronizing wheel 62, the terminal end $62a_1$ of spoke 62 will be moved out of proximity with the sensor 60. This condition will cause another optical signal to be sent to the controller 64 which will responsively deactivate the solenoid valve 68 and thereby result in the cylinder 50 being actuated so as to extend the actuator rod 50a. As a result, the detent finger 42a will again be moved into engagement with the lower edge of the next sequential forwardmost battery plate BP in the stack 24.

The synchronizing control system described above represents the presently preferred embodiment according to the present invention. Other equivalent electrical and/or pneumatic control systems may be envisioned, however. For example, a magnetic proximity sensor may be provided to sense the proximity of magnetic targets attached to the shaft about which the carrier drum 30 rotates. Furthermore, shaft position encoding/sensing systems are well known and may be employed in the practice of this invention. Suffice it to say, therefore, that virtually any synchronizing system may be employed provided that it is sufficiently responsive to cause the detent finger 42a to move between its stop and release positions at the operating speed of the apparatus 10.

Figure 6:
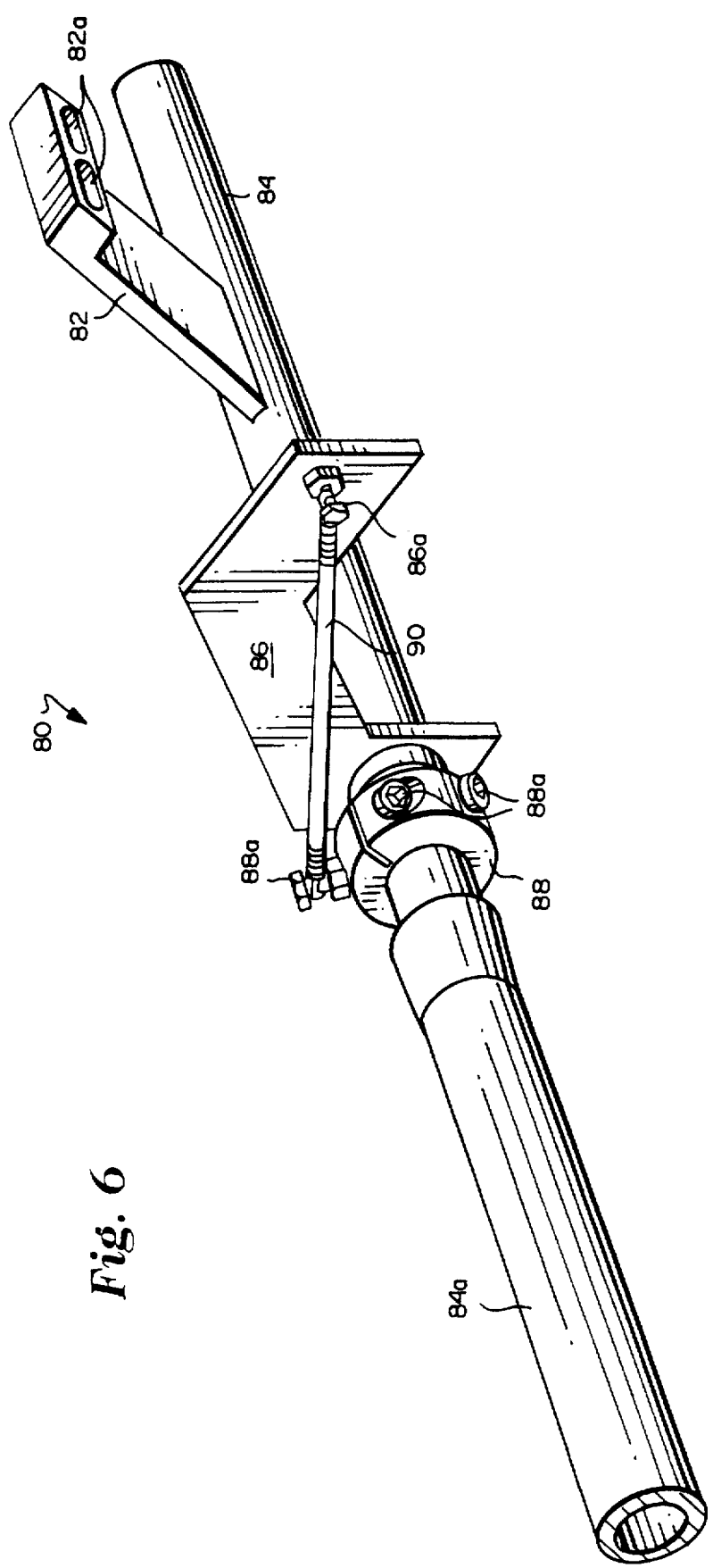
FIG. 6 is a perspective view showing a vacuum assist transfer arm assembly that may optionally be employed in the plate feeding apparatus according to this invention shown in FIG. 1.
Figure 7:
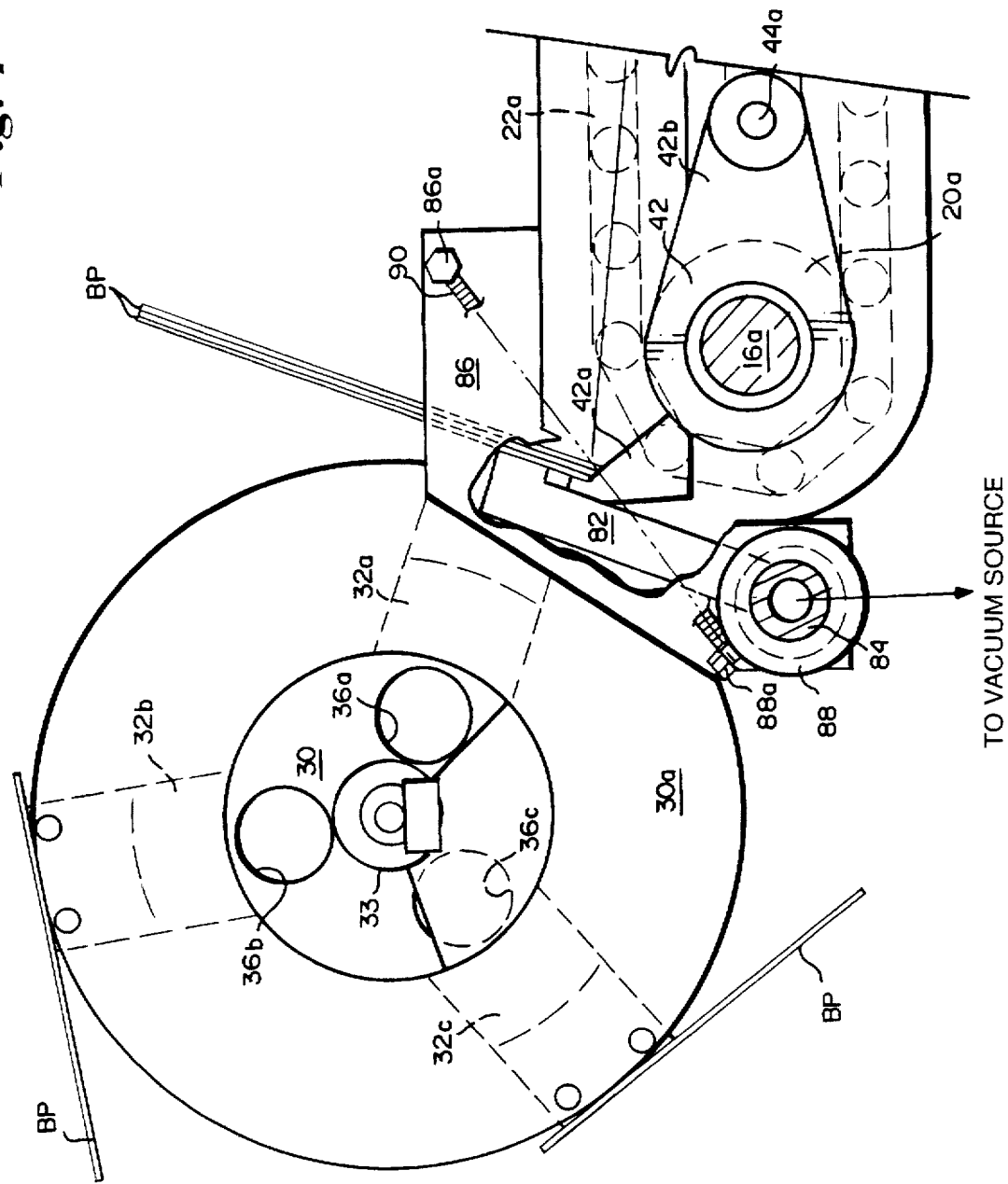

Accompanying FIGS. 6–8 show an optional vacuum assist transfer arm assembly 80 which may be employed in the apparatus 10 according to this invention. In this regard, the transfer arm assembly 80 may be particularly useful if relatively large-sized (and hence heavier) battery plates BP are desired to be processed.

The vacuum assist transfer arm assembly 80 includes a hollow transfer arm 82 which radially extends from the tubular support shaft 84 and includes apertures 82a at its terminal end. The support shaft 84 is connected to a conduit 84a which is in fluid-communication with a vacuum source (not shown). The support shaft 84 is rotatably supported at the lower end of support arm 86 so as to be capable of free pivotal movements about the shaft's 84 longitudinal axis. The opposite end of support arm 86 is itself rigidly coupled to immovable structure associated with the apparatus 10, for example, to the side plate 12. A collar 88 is positionally fixed to the shaft 84 by means of set screws 88a. A tension spring 90 extends between one of the set screws 88a and an attachment screw 86a located at the upper end of the support arm 86.

As is perhaps more clearly shown in FIGS. 7 and 8, the vacuum assist transfer arm assembly 80 is positioned such that the transfer arm 82 is forwardly (relative to the directional movement of the stack 24 of battery plates BP toward the rotary carrier assembly 15) of the detent finger 42a. Moreover, the tension spring 90 is oriented such that the transfer arm 82 is constantly urged into physical contact with the detent finger 42a. As a result, when the detent finger 42a is in its stop position, the transfer arm 82 will rest against the forwardmost one of the battery plates BP in the stack 24. Such a state is shown in FIG. 7.

Since a vacuum is being drawn through the apertures 82a, the forwardmost battery plate BP in the stack 24 is captured by and moved with the transfer arm 82 upon movement of the detent finger 42a into its released position. More specifically, movement of the detent finger 42a into its released position as shown in FIG. 8 will responsively pivotally drive the transfer arm in a counter-clockwise direction (as viewed in FIG. 8) against the bias force of the spring 90. As a result, the transfer arm 82 carries the forwardmost one of the battery plates BP in the stack 24 toward the pick-up head 32a. The transfer arm 82 is, however, pivotally driven by the detent finger 42a a sufficient distance so that the transfer arm 82 physically enters the central space of the U-shaped pick-up heads. As a result, the vacuum-captured relationship between the battery plate BP and the pick-up head 32a will be broken since the battery plate will then be captured by the much greater vacuum being drawn through the pick-up head 32a. Rotation of the drum 30 will thereby carry the battery plate BP away from the transfer arm 82 so that upon movement of the detent finger 42a to its stop position, the transfer arm 82 will not contact or otherwise interfere with the battery plate now carried by pick-up head 32a. The operational sequence described above repeats for each of the pick-up heads 32a–32c in response to movement of the detent finger 42a between its stop and released positions as has already been described in detail.

Although the vacuum pick-up heads 32a–32c have been described above as being U-shaped, it should be noted that the pick-up heads 32a–32c could be formed in any desired configuration. For example, when an apparatus 10 according to the present invention does not include the optional vacuum assist transfer arm assembly 80, then the forward face of the pick-up heads 32a–32c could be a substantially planar (or slightly curved) rectangular configuration so as to maximize the surface area contact with the battery plate BP. When employing the optional vacuum assist transfer arm assembly, however, it is particularly preferred that the pick-up heads 32a–32c be U-shaped as shown and described above so as to accommodate pivotal movement of the transfer arm 82 toward the carrier drum 30 and to more easily allow release of the battery plate BP carried thereby in favor of the pick-up heads 32a–32c. However, even when employing the optional vacuum assist transfer arm assembly, planar (or slightly curved) rectangular vacuum pick-up head faces could be employed provided that the transfer arm 82 is positioned and/or configured to avoid contact with the pick-up heads 32a–32c (e.g., by limiting its rotational travel and/or positioning it so it does not interfere with rotation of the pick-up heads).

Thus, while the present invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for sequentially removing plates from a stack of plates comprising:

a rotary carrier assembly having at least one vacuum pick-up head for removing a forwardmost one of the plates from the stack;

a conveyor for supporting the stack of plates and advancing the stack of plates toward the rotary carrier;

a plate feed assembly having a detent finger which is pivotally movable between a detent position in which said detent finger arrests advancement of the stack of plates toward the carrier assembly and thereby establishes a transfer gap between the forwardmost one of the plates in the stack and the carrier assembly, and a release position in which said detent member is spaced from the forwardmost one of the plates in the stack to thereby release the forwardmost one of the plates in the stack in response to substantial alignment of said at least one vacuum pick-up head; and a vacuum assist transfer arm assembly to assist in the transfer of said forwardmost one of the plates stripped from the stack across said established space, said vacuum assist transfer arm assembly including, (i) a rotatable tubular support shaft connectable to a vacuum source;

(ii) a hollow transfer arm radially extending from said support shaft so as to be in contact with said detent finger, said transfer arm having a terminal end and apertures formed in said terminal end which are adapted to fluid-communicate with a vacuum source through said transfer arm, (iii) said transfer arm being pivotal with said support shaft between a first position in which the terminal end of said transfer arm contacts the forwardmost one of the plates in the stack, and a second position in which the terminal end of said transfer arm is positioned adjacent said at least one vacuum head, and wherein (iv) pivotal movement of said detent finger between said detent and release positions thereof responsively pivotally drives said transfer arm between said first and second positions thereof, respectively, whereby said forwardmost one of the plates is stripped from the stack and is transferred across said established space so as to be captured by the vacuum pick-up head and be rotated thereby.

2. The apparatus of claim 1, wherein said plate feed assembly includes:

a control system for controllably moving said detent member between said detent and release positions thereof in synchronous relationship to rotation of said rotary carrier assembly.

3. The apparatus of claim 2, wherein said control system includes an optical synchronizing system.

4. The apparatus of claim 3, wherein said optical synchronizing system includes:

a synchronizing wheel which is rotatable as a unit with said rotary carrier assembly and includes an optical target which is indicative of alignment between said vacuum pick-up head and the forwardmost one of the plates in the stack;

a photoelectric sensor for sensing presence of said optical target of said synchronizing wheel and issuing a position signal in response thereto; and a control system for receiving the position signal and moving said detent member from said detent position and into said release position.

5. Apparatus as in claim 4, wherein said control system includes:

a pivotal rocker arm coupled to said detent member for moving said detent member between said detent and released positions, and a actuator assembly coupled to said rocker arm for pivotally moving said rocker arm in response to said position signal.

6. Apparatus as in claim 5, wherein said actuator assembly includes:

an air cylinder having an actuator rod moveable between advanced and retracted positions;

an actuator lever attached at one end to said rocker arm and at another end to said actuator rod;

a solenoid valve which receives said position signal and in response thereto pneumatically actuates said air cylinder to move said actuator rod to move between said extended and retracted positions and thereby cause said rocker arm to pivot, whereby said detent member is moved from said detent position and into said release position.

7. Apparatus as in claim 6, wherein said actuator assembly further includes a rocker shaft to which said one end of said actuator lever and said rocker arm are rigidly attached.

8. Apparatus as in claim 7, wherein said detent member includes a yoke flange, and wherein said rocker arm includes a coupling shaft coupled operatively to said yoke flange such that pivotal movement of said rocker arm drives said yoke flange to move said detent member between said detent and release positions.

9. Apparatus as in claim 1 or 8, wherein said detent member includes a removable shim plate.

10. Apparatus for sequentially removing plates from a stack of plates comprising:

a conveyor for supporting and forwardly conveying the stack of plates;

a rotary carrier assembly having multiple radially spaced-apart vacuum heads each of which is fluid-connectable to a vacuum source for sequentially removing a forwardmost plate from the stack of plates and transporting the same to a downstream location;

vacuum timing means for selectively and sequentially establishing fluid communication between said vacuum pick-up heads and said vacuum source during one rotary travel segment of said rotary carrier assembly to allow the vacuum pick-up heads to capture a respective said forwardmost plate in the stack and transport it along said one rotary travel segment, and for sequentially terminating fluid communication between said vacuum pick-up heads and said vacuum source during another rotary travel segment of said rotary carrier wherein said forwardmost plates are released from said vacuum pick-up heads and fall by gravity to the downstream location;

plate feed means having a detent finger which is pivotally movable between a detent position in which said detent finger arrests forward conveyance of the stack of plates toward said rotary carrier assembly to establish a transfer gap therebetween, and a release position in which said detent member is spaced from the forwardmost one of the plates in the stack to thereby release a forwardmost plate in the stack in response to substantial alignment of one of said vacuum pick-up heads with the stack; and a vacuum assist transfer arm assembly to assist in the transfer of said forwardmost one of the plates stripped from the stack across said established space, said vacuum assist transfer arm assembly including,
  (i) a hollow transfer arm in contact with said detent finger, said transfer arm having a terminal end and apertures formed in said terminal end which are adapted to fluid-communicate with a vacuum source through said transfer arm,
  (ii) said transfer arm being pivotal between a first position in which the terminal end of said transfer arm contacts the forwardmost one of the plates in the stack, and a second position in which the terminal end of said transfer arm is positioned adjacent said at least one vacuum head, and wherein
  (iii) pivotal movement of said detent finger between said detent and release positions thereof responsively pivotally drives said transfer arm between said first and second positions thereof, respectively.

11. The apparatus of claim 10, wherein said plate feed means includes:

control means for controllably moving said detent member between said detent and release positions thereof in response to one of said vacuum pick-up heads being rotated by said rotary carrier assembly into substantial alignment with the stack of plates.

12. Apparatus as in claim 10 or 11, wherein said detent member includes an upwardly projecting detent finger for engaging a lower edge of the forwardmost plate in the stack when said detent member is in said detent position.

13. Apparatus as in claim 12, wherein said control means includes:

a rocker arm pivotal between first and second conditions and coupled to said detent member for pivotally driving said detent member between said detent and release positions in response to pivotal movements of said rocker arm between said first and second conditions; and actuator means for pivoting said rocker arm between said first and second conditions thereof.

14. Apparatus as in claim 13, wherein said actuator means, includes an air cylinder having an actuator rod which is coupled operatively to said rocker arm.

15. Apparatus as in claim 14, wherein said control means includes a rocker shaft rigidly coupled to said rocker arm, and an actuator lever having one end connected rigidly to said rocker shaft and another end connected operatively to said actuator rod.

16. Apparatus as in claim 12, wherein said detent finger includes a removable shim plate.

17. Apparatus as in claim 11, wherein said control means includes position sensing means for sensing positions of said vacuum pick-up heads and for moving said detent member from said detent position and into said release position thereof in response to sensing substantial positional alignment between one of said vacuum pick-up heads and the stack of plates.

18. Apparatus as in claim 17, wherein said position sensing means includes a photoelectric sensor system.

19. Apparatus as in claim 18, wherein said photoelectric sensor system includes an optical proximity sensor system having an optical timing wheel which is provided with optical targets corresponding in number to said multiple vacuum pick-up heads.

20. Apparatus as in claim 19, wherein said optical proximity sensor system issues a signal to said control means in response to sensing one of said optical targets indicative of a respective one of said vacuum pick-up heads being in substantial alignment with the stack of plates to cause said control means to move said detent member from said detent position and into said release position thereof.

21. Apparatus as in claim 1 or 10, wherein said vacuum assist transfer arm assembly is biased into contact with the forwardmost plate in the stack.

22. Apparatus as in claim 1 or 10, wherein said vacuum pick-up heads are U-shaped so as to accommodate pivotal movement of said vacuum assist transfer arm assembly towards said vacuum pick-up heads.

23. Apparatus for sequentially removing plates from a stack of plates comprising:

a rotary carrier assembly having at least one generally U-shaped vacuum pick-up head having a central space and connectable to a vacuum source so as to capture a forwardmost one of the plates from the stack;

a conveyor for supporting the stack of plates and advancing the stack of plates toward the rotary carrier; and a vacuum assist transfer arm assembly having an apertured terminal end in fluid-communication with the vacuum source, wherein said vacuum assist transfer arm assembly is pivotally movable between a first position in which said terminal end of said transfer arm assembly contacts the forwardmost one of the plates in the stack, and a second position in which the transfer arm assembly is accommodated within said central space of said U-shaped vacuum pick-up head, thereby to assist in transference of the forwardmost one of the plates in the stack to said at least one vacuum pick-up head.

24. Apparatus as in claim 23, further comprising a plate feed assembly for arresting advancement of the stack of plates toward the carrier assembly and thereby establishing a transfer gap between the forwardmost one of the plates in the stack and the carrier assembly, and then releasing the forwardmost one of the plates in the stack in response to substantial alignment of said at least one vacuum pick-up head, wherein said fowardmost one of the plates is stripped from the stack and is transferred across said established space so as to be captured by the vacuum pick-up head and be rotated thereby.

25. The apparatus of claim 24, wherein said plate feed assembly includes:

a detent member pivotal between a detent position wherein said detent member contacts the forwardmost one of the plates in the stack to thereby establish said transfer gap, and a release position wherein said detent member is spaced from the forwardmost one of the plates in the stack and thereby allow the forwardmost one of the plates in the stack to be transferred across said transfer gap; and a control system for controllably moving said detent member between said detent and release positions thereof in synchronous relationship to rotation of said rotary carrier assembly.

26. The apparatus of claim 25, wherein said control system includes an optical synchronizing system.

27. The apparatus of claim 26, wherein said optical synchronizing system includes:

a synchronizing wheel which is rotatable as a unit with said rotary carrier assembly and includes an optical target which is indicative of alignment between said vacuum pick-up head and the forwardmost one of the plates in the stack;

a photoelectric sensor for sensing presence of said optical target of said synchronizing wheel and issuing a position signal in response thereto; and a control system for receiving the position signal and moving said detent member from said detent position and into said release position.

28. Apparatus as in claim 27, wherein said control system includes:

a pivotal rocker arm coupled to said detent member for moving said detent member between said detent and released positions, and an actuator assembly coupled to said rocker arm for pivotally moving said rocker arm in response to said position signal.

29. Apparatus as in claim 28, wherein said actuator assembly includes:

an air cylinder having an actuator rod moveable between advanced and retracted positions;

an actuator lever attached at one end to said rocker arm and at another end to said actuator rod;

a solenoid valve which receives said position signal and in response thereto pneumatically actuates said air cylinder to move said actuator rod to move between said extended and retracted positions and thereby cause said rocker arm to pivot, whereby said detent member is moved from said detent position and into said release position.

30. Apparatus as in claim 29, wherein said actuator assembly further includes a rocker shaft to which said one end of said actuator lever and said rocker arm are rigidly attached.

31. Apparatus as in claim 30, wherein said detent member includes a yoke flange, and wherein said rocker arm includes a coupling shaft coupled operatively to said yoke flange such that pivotal movement of said rocker arm drives said yoke flange to move said detent member between said detent and release positions.

32. Apparatus as in claim 24 or 31, wherein said detent member includes a removable shim plate.

33. Apparatus as in claim 25, wherein said vacuum assist transfer arm assembly is positioned forwardly of said detent member so that said detent member pivotally drives said vacuum assist transfer arm assembly in response to movement thereof between said detent and release positions.

34. Apparatus as in claim 24, wherein said control system includes:

a pivotal rocker arm coupled to said detent member for moving said detent member between said detent and released positions, and an actuator assembly coupled to said rocker arm for pivotally moving said rocker arm in response to a position signal.

35. Apparatus as in claim 34, wherein said actuator assembly includes:

an air cylinder having an actuator rod moveable between advanced and retracted positions;

an actuator lever attached at one end to said rocker arm and at another end to said actuator rod;

a solenoid valve which receives said position signal and in response thereto pneumatically actuates said air cylinder to move said actuator rod to move between said extended and retracted positions and thereby cause said rocker arm to pivot, whereby said detent member is moved from said detent position and into said release position.

36. Apparatus as in claim 35, wherein said actuator assembly further includes a rocker shaft to which said one end of said actuator lever and said rocker arm are rigidly attached.

37. Apparatus as in claim 36, wherein said detent member includes a yoke flange, and wherein said rocker arm includes a coupling shaft coupled operatively to said yoke flange such that pivotal movement of said rocker arm drives said yoke flange to move said detent member between said detent and release positions.

38. Apparatus as in claim 23, wherein said vacuum assist transfer arm assembly is biased into contact with the forwardmost one of the plates in the stack.

39. Apparatus for sequentially removing plates from a stack of plates comprising:

a rotary carrier assembly having at least one vacuum pick-up head for removing a forwardmost one of the plates from the stack;

a conveyor for supporting the stack of plates and advancing the stack of plates toward the rotary carrier; and a plate feed assembly for arresting advancement of the stack of plates toward the carrier assembly and thereby establishing a transfer gap between the forwardmost one of the plates in the stack and the carrier assembly, and then releasing the forwardmost one of the plates in the stack in response to substantial alignment of said at least one vacuum pick-up head, wherein said forwardmost one of the plates is stripped from the stack and is transferred across said established space so as to be captured by the vacuum pick-up head and be rotated thereby, wherein said plate feed assembly includes, (i) a detent member pivotal between a detent position wherein said detent member contacts the forwardmost one of the plates in the stack to thereby establish said transfer gap, and a release position wherein said detent member is spaced from the forwardmost one of the plates in the stack and thereby allow the forwardmost one of the plates in the stack to be transferred across said transfer gap; and (ii) a control system for controllably moving said detent member between said detent and release positions thereof in synchronous relationship to rotation of said rotary carrier assembly, and wherein said control system includes an optical synchronizing system having, (1) a synchronizing wheel which is rotatable as a unit with said rotary carrier assembly and includes an optical target which is indicative of alignment between said vacuum pick-up head and the forwardmost one of the plates in the stack;

(2) a photoelectric sensor for sensing presence of said optical target of said synchronizing wheel and issuing a position signal in response thereto; and (3) a control assembly for receiving the position signal and moving said detent member from said detent position and into said release position.

40. Apparatus as in claim 39, wherein said control system includes:

a pivotal rocker arm coupled to said detent member for moving said detent member between said detent and released positions, and a actuator assembly coupled to said rocker arm for pivotally moving said rocker arm in response to said position signal.

41. Apparatus as in claim 40, wherein said actuator assembly includes:

an air cylinder having an actuator rod moveable between advanced and retracted positions;

an actuator lever attached at one end to said rocker arm and at another end to said actuator rod;

a solenoid valve which receives said position signal and in response thereto pneumatically actuates said air cylinder to move said actuator rod to move between said extended and retracted positions and thereby cause said rocker arm to pivot, whereby said detent member is moved from said detent position and into said release position.

42. Apparatus as in claim 41, wherein said actuator assembly further includes a rocker shaft to which said one end of said actuator lever and said rocker arm are rigidly attached.

43. Apparatus as in claim 42, wherein said detent member includes a yoke flange, and wherein said rocker arm includes a coupling shaft coupled operatively to said yoke flange such that pivotal movement of said rocker arm drives said yoke flange to move said detent member between said detent and release positions.

44. Apparatus as in claim 43, wherein said detent member includes a removable shim plate.

45. Apparatus for sequentially removing plates from a stack of plates comprising:

a conveyor for supporting and forwardly conveying the stack of plates;

a rotary carrier assembly having multiple radially spaced-apart vacuum heads each of which is fluid-connectable to a vacuum source for sequentially removing a forwardmost plate from the stack of plates and transporting the same to a downstream location;

vacuum timing means for selectively and sequentially establishing fluid communication between said vacuum pick-up heads and said vacuum source during one rotary travel segment of said rotary carrier assembly to allow the vacuum pick-up heads to capture a respective said forwardmost plate in the stack and transport it along said one rotary travel segment, and for sequentially terminating fluid communication between said vacuum pick-up heads and said vacuum source during another rotary travel segment of said rotary carrier wherein said forwardmost plates are released from said vacuum pick-up heads and fall by gravity to the downstream location; and plate feed means for arresting forward conveyance of the stack of plates toward said rotary carrier assembly to establish a transfer gap therebetween, and sequentially releasing forwardmost plates in the stack in response to substantial alignment of one of said vacuum pick-up heads with the stack, wherein said detent member includes an upwardly projecting detent finger for engaging a lower edge of the forwardmost plate in the stack when said detent member is in said detent position, said detent finger includes a removable shim plate, and wherein said control means includes, (i) a rocker arm pivotal between first and second conditions and coupled to said detent member for pivotally driving said detent member between said detent and release positions in response to pivotal movements of said rocker arm between said first and second conditions;

(ii) actuator means for pivoting said rocker arm between said first and second conditions thereof, said actuator means including an air cylinder having an actuator rod which is coupled operatively to said rocker arm;

(iii) a rocker shaft rigidly coupled to said rocker arm; and (iv) an actuator lever having one end connected rigidly to said rocker shaft and another end connected operatively to said actuator rod.

46. The apparatus of claim 45, wherein said plate feed means includes:

a detent member pivotally movable between a detent position wherein said detent member contacts the forwardmost plate in the stack to establish said gap and prevent transfer of the forwardmost plate thereacross, and a release position wherein said detent member is spaced from the forwardmost plate in the stack to allow the forwardmost plate to be transferred across the established gap; and control means for controllably moving said detent member between said detent and release positions thereof in response to one of said vacuum pick-up heads being rotated by said rotary carrier assembly into substantial alignment with the stack of plates.

47. Apparatus as in claim 46, wherein said control means includes position sensing means for sensing positions of said vacuum pick-up heads and for moving said detent member from said detent position and into said release position thereof in response to sensing substantial positional alignment between one of said vacuum pick-up heads and the stack of plates.

48. Apparatus as in claim 47, wherein said position sensing means includes a photoelectric sensor system.

49. Apparatus as in claim 48, wherein said photoelectric sensor system includes an optical proximity sensor system having an optical timing wheel which is provided with optical targets corresponding in number to said multiple vacuum pick-up heads.

50. Apparatus as in claim 48, wherein said optical proximity sensor system issues a signal to said control means in response to sensing one of said optical targets indicative of a respective one of said vacuum pick-up heads being in substantial alignment with the stack of plates to cause said control means to move said detent member from said detent position and into said release position thereof.

* * * * *